(12) United States Patent
Liu et al.

(10) Patent No.: US 10,812,170 B2
(45) Date of Patent: Oct. 20, 2020

(54) ANTENNA STRUCTURE AND SIGNAL RECEPTION OF ELECTRONIC DEVICE

(71) Applicant: Beijing Xiaomi Mobile Software Co., Ltd., Beijing (CN)

(72) Inventors: Jianan Liu, Beijing (CN); Zonglin Xue, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/588,527

(22) Filed: Sep. 30, 2019

(65) Prior Publication Data
US 2020/0136716 A1   Apr. 30, 2020

(30) Foreign Application Priority Data
Oct. 31, 2018 (CN) .......................... 2018 1 1283637

(51) Int. Cl.
*H04B 17/00* (2015.01)
*H04B 7/08* (2006.01)
*H01Q 1/24* (2006.01)
*H01Q 1/36* (2006.01)
*H04B 1/00* (2006.01)

(52) U.S. Cl.
CPC ........... *H04B 7/0817* (2013.01); *H01Q 1/241* (2013.01); *H01Q 1/36* (2013.01); *H04B 1/006* (2013.01); *H04B 7/0808* (2013.01); *H04B 7/0831* (2013.01)

(58) Field of Classification Search
CPC .... H04B 7/0817; H04B 1/006; H04B 7/0808; H04B 7/0831; H01Q 1/241; H01Q 1/36
USPC .................................. 455/13.1, 562.1, 226.1
See application file for complete search history.

(56) References Cited

U.S. PATENT DOCUMENTS

| | | | | |
|---|---|---|---|---|
| 5,430,769 A | * | 7/1995 | Patsiokas | H04B 7/0814 375/347 |
| 5,499,397 A | * | 3/1996 | Wadin | H04B 7/0814 375/347 |

(Continued)

FOREIGN PATENT DOCUMENTS

| | | |
|---|---|---|
| CN | 105281035 A | 1/2016 |
| CN | 107453766 A | 12/2017 |

(Continued)

OTHER PUBLICATIONS

Extended European Search Report dated Feb. 4, 2020, in Patent Application No. 19206420.2, 10 pages.

(Continued)

*Primary Examiner* — Sonny Trinh
(74) *Attorney, Agent, or Firm* — Oblon, McClelland, Maier & Neustadt, L.L.P.

(57) ABSTRACT

The present disclosure relates to an antenna structure. The antenna structure includes a plurality of receiver paths that are ranked based on a preset manner to obtain a ranking order of each of the plurality of receiver paths; a plurality of antennas; and a switch disposed between the plurality of antennas and the plurality of receiver paths, wherein the switch is configured to change a connection relationship between the plurality of antennas and the plurality of receiver paths based on a signal strength of the plurality of antennas and the ranking order of the plurality of the receiver paths.

18 Claims, 7 Drawing Sheets

(56) References Cited

U.S. PATENT DOCUMENTS

| | | | | |
|---|---|---|---|---|
| 6,456,257 | B1* | 9/2002 | Zamat | H01Q 25/002 |
| | | | | 343/853 |
| 7,701,410 | B2* | 4/2010 | Li | H04B 1/406 |
| | | | | 343/876 |
| 8,761,701 | B2* | 6/2014 | Ramasamy | H04B 7/0814 |
| | | | | 455/133 |
| 8,830,130 | B2* | 9/2014 | Tseng | H01Q 1/243 |
| | | | | 343/702 |
| 10,069,195 | B1* | 9/2018 | Asrani | H01Q 1/245 |
| 2010/0035570 | A1 | 2/2010 | Tsukio et al. | |
| 2011/0249765 | A1 | 10/2011 | Han | |
| 2013/0316662 | A1 | 11/2013 | Bengtsson et al. | |
| 2014/0334322 | A1* | 11/2014 | Shtrom | H01Q 1/2291 |
| | | | | 370/252 |

FOREIGN PATENT DOCUMENTS

| | | | |
|---|---|---|---|
| CN | 107465428 | A | 12/2017 |
| CN | 107682056 | A | 2/2018 |
| CN | 108601040 | A | 9/2018 |

OTHER PUBLICATIONS

State Intellectual Property Office of the People's Republic of China, Office Action and Search Report dated Apr. 26, 2020 in Application No. 2018112836370, (12 pages).

* cited by examiner

ANTENNA STRUCTURE AND SIGNAL RECEPTION OF ELECTRONIC DEVICE

CROSS-REFERENCE TO RELATED APPLICATIONS

This application is based on and claims priority to Chinese Patent Application No. 201811283637.0 filed on Oct. 31, 2018, the entire contents of which are incorporated herein by reference.

TECHNICAL FIELD

The present disclosure relates to an antenna structure, a method of receiving a signal by an electronic device, a signal receiving apparatus, and an electronic device.

BACKGROUND

Electronic devices, such as, mobile phones and tablets, need to transmit and receive signals through antennas when implementing communication functions, such as the transmission of network data, voice calls, etc.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide an antenna structure. The antenna structure includes a plurality of receiver paths that are ranked based on a preset manner to obtain a ranking order of each of the plurality of receiver paths; a plurality of antennas; and a switch disposed between the plurality of antennas and the plurality of receiver paths, wherein the switch is configured to change a connection relationship between the plurality of antennas and the plurality of receiver paths based on a signal strength of the plurality of antennas and the ranking order of the plurality of the receiver paths.

According to an aspect, the switch is further configured to according to a signal strength of at least one of the plurality of antennas, determine receiver paths in the plurality of receiver paths to couple with the at least one of the plurality of antennas, such that the signal strength of the at least one of the plurality of antennas is positively correlated with ranking orders of the coupled receiver paths.

In an example, the plurality of receiver paths are ranked based on signal sensitivity in a descending order.

According to another aspect, the plurality of receiver paths include at least one first receiver path, wherein a connection relationship between the at least one first receiver path and the plurality of antennas is unchanged; and at least one second receiver path other than the at least one first receiver path in the plurality of receiver paths, wherein the ranking order of each of the at least one first receiver path is lower than the ranking order of each of the at least one second receiver path.

According to yet another aspect, the plurality of antennas are coupled with the plurality of receiver paths by the switch based on a preset connection relationship in a default state, and the preset connection relationship is obtained according to a connection relationship between the plurality of antennas and the plurality of receiver paths in historical data.

According to yet another aspect, the plurality of receiver paths include a particular receiver path as a primary transmitter path and a primary receiver path; and remaining receiver paths other than the particular receiver path in the plurality of receiver paths as diversity receiver paths.

In an example, a ranking order of the particular receiver path is highest.

In another example, positions of the at least one of the plurality of antennas are different.

Aspects of the disclosure also provide a method of receiving a signal by an electronic device including an antenna structure that includes a plurality of receiver paths, a plurality of antennas, and a switch disposed between the plurality of antennas and the plurality of receiver paths. The method includes determining a signal strength of at least one of the plurality of antennas with respect to a signal currently associated with the at least one of the plurality of antennas; changing a connection relationship between the at least one of the plurality of antennas and the plurality of the receiver paths through the switch, wherein after being changed, the signal strength of the at least one of the plurality of antennas is positively correlated with ranking orders of the coupled receiver paths, wherein the plurality of receiver paths are ranked based on a preset manner to obtain a ranking order of each of the plurality of receiver paths; and receiving the signal based on a changed connection relationship between the plurality of antennas and the plurality of the receiver paths.

In an example, the preset manner includes ranking the plurality of receiver paths according to signal sensitivity in a descending order.

According to an aspect, when switching the connection relationship between the at least one of the plurality of antennas and the plurality of receiver paths through the switch, the method further includes, when a number of the plurality of antennas does not exceed a preset threshold, changing the connection relationship between the plurality of antennas and the plurality of receiver paths through the switch; and when the number of the plurality of antennas exceeds the preset threshold, changing a connection relationship between at least one of the plurality of antennas having a ranking order less than or equal to the preset threshold and the receiver paths through the switch.

Aspects of the disclosure also provide an electronic device. The electronic device includes an antenna structure. The antenna structure includes a plurality of receiver paths that are ranked based on a preset manner to obtain a ranking order of each of the plurality of receiver paths; a plurality of antennas; and a switch disposed between the plurality of antennas and the plurality of receiver paths, wherein the switch is configured to change a connection relationship between the plurality of antennas and the plurality of receiver paths based on a signal strength of the plurality of antennas and the ranking order of the plurality of the receiver paths.

It is to be understood that both the foregoing general description and the following detailed description are illustrative and explanatory only and are not restrictive of the present disclosure.

BRIEF DESCRIPTION OF DRAWINGS

The accompanying drawings, which are incorporated in and constitute a part of this specification, illustrate aspects consistent with the present disclosure and. Together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

The terms used in the present application are for the purpose describing particular aspects, and are not intended to limit the present disclosure. The singular forms "a", "said" and "the" are intended to include plural forms unless the context clearly indicates otherwise. It should also be understood that the term "and/or" as used herein refers to and encompasses any or all possible combinations of one or more of the associated listed items.

It should be understood that although the terms first, second, third, etc. may be used to describe various information in the disclosure, such information should not be limited to these terms. These terms are only used to distinguish the same type of information from each other. For example, the first information may also be referred to as the second information without departing from the scope of the present application. Similarly, the second information may also be referred to as the first information. Depending on the context, the word "if" as used herein may be interpreted as "when" or "while" or "in response to a determination."

Figure 1:
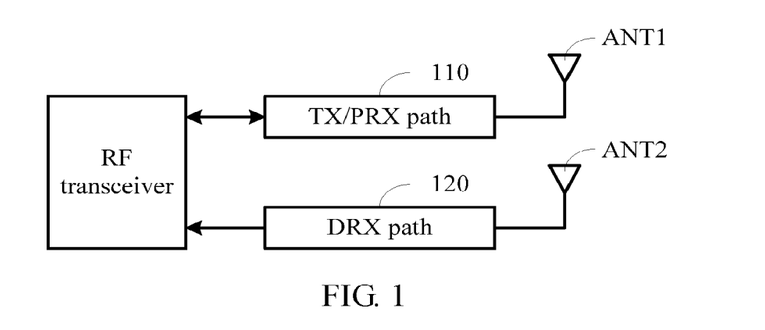
FIG. 1 is a schematic diagram of an antenna structure according to a related aspect of the present disclosure.

In a related aspect, taking an electronic device being a mobile phone as an example, the antenna structure of the mobile phone widely adopts a primary diversity antenna technology. As shown in FIG. 1, a receiver path of the antenna structure includes a Primary Receiver (PRX) path 110 and a Diversity Receiver (DRX) path 120, and the Transmitter (TX) path and the PRX path 110 share a same hardware path. Correspondingly, antenna ends includes a primary antenna ANT1 coupled with the TX/PRX path 110, and a diversity antenna ANT2 coupled with the DRX path 120. Based on the above connection relationship, the primary antenna ANT1 is coupled with the radio frequency (RF) transceiver 130 through the TX/PRX path 110, to realize the primary transmission and the primary reception of signals; and the diversity antenna ANT2 is coupled with the RF transceiver 130 through the DRX path 120 to realize the diversity reception of signals.

However, on the one hand, the number of antennas in the related aspect is less and thus sensitivity and throughput of the reception are lower. On the other hand, when an antenna of a receiver path is affected by the external environment, receiving performance of the antenna of the receiver path may be reduced and thus the normal operation of the receiver path may be affected.

Based on this, examples of the present disclosure provide an improved antenna structure to solve the above technical problems in the related aspect.

Figure 2:
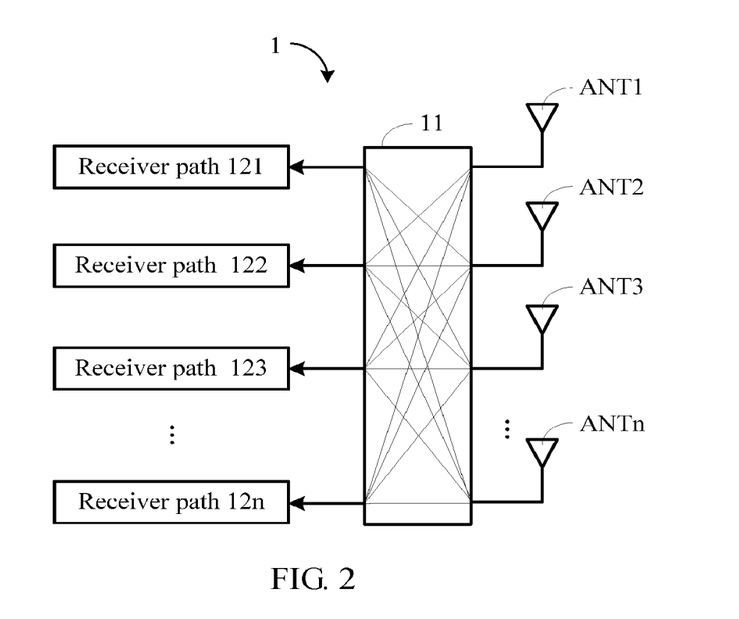
FIG. 2 is a schematic diagram of an antenna structure according to an exemplary aspect of the present disclosure.

FIG. 2 is a schematic diagram of an antenna structure according to an example. As shown in FIG. 2, the antenna structure 1 may include a plurality of receiver paths 121-12n, a plurality of antennas ANT1-ANTn (n is an integer greater than 1), and a switch 11. The plurality of receiver paths 121-12n are ranked in a preset manner, for example, from the receiver path 121 to the receiver path 12n shown in FIG. 2. The plurality of antennas ANT1-ANTn are coupled with the plurality of receiver paths 121-12n. The switch 11 is located between the antennas ANT1-ANTn and the receiver paths 121-12n, and configured to switch or change receiver paths coupled with at least part of the antennas according to the signal strength of the at least part of the antennas, so that after being switched, the signal strength of the at least part of the antennas is positively correlated with a ranking order of the receiver paths coupled with the at least part of the antennas. The number of the antennas and the number of the receiver paths may be same (as shown in FIG. 2), or may be different. For example, the number of the antennas may be greater than (or less than) the number of the receiver paths and the disclosure does not limit this.

Due to influence of the external environment, when the signal strength of various antennas may be different with respect to the signal in a same frequency band, the connection relationship between antenna and receiver path is switched in real time through the switch, such that the antenna with higher signal strength is coupled with the receiver path with higher ranking, thereby ensuring that the receiver path with higher ranking may always be coupled with the antenna with higher signal strength. The importance of the receiver paths may be determined from different dimensions to rank the receiver paths. For example, the plurality of receiver paths may be ranked in a descending order according to the signal sensitivity, such that the higher the signal sensitivity of the receiver path (which may be understood as an ability to resolve the signal), the higher the ranking of the receiver path. Based on the above ranking method, it is ensured that the receiver path with higher signal sensitivity may always be coupled with the antenna with higher signal strength for a currently coupled signal. In this way, the characteristic of relatively high signal sensitivity of the receiver path can be fully used, and the receiving performance of the antenna structure can be maximized.

The primary diversity antenna technique may be applied to the antenna structure provided by examples of the present disclosure. For example, a particular of the plurality of receiver paths may be configured to be as a primary transmitter path and a primary receiver path, while other receiver paths other than the particular receiver path may be configured to be as diversity receiver paths. Since the primary transmitter path and the primary receiver path share the same hardware path, to preferentially ensure the performance of the primary transmitter path and the performance of the primary receiver path, the ranking order of the particular receiver path may be configured to be the highest, such that the signal strength of the antenna coupled with the particular receiver path is also the highest.

FIG. 2 illustrates an example in which the connection relationship between all antennas and all receiver paths is switchable (i.e., "globally switched"). It is also possible to keep the connection relationship between at least part of the antennas and at least part of the receiver paths unchanged, and only the connection relationship between remaining antennas other than the at least part of the antennas and remaining receiver paths other than the at least part of the receiver paths is switchable. In this case, the rankings of the at least part of the receiver paths with unchanged connection relationship are lower than that of the remaining receiver paths.

Figure 3:
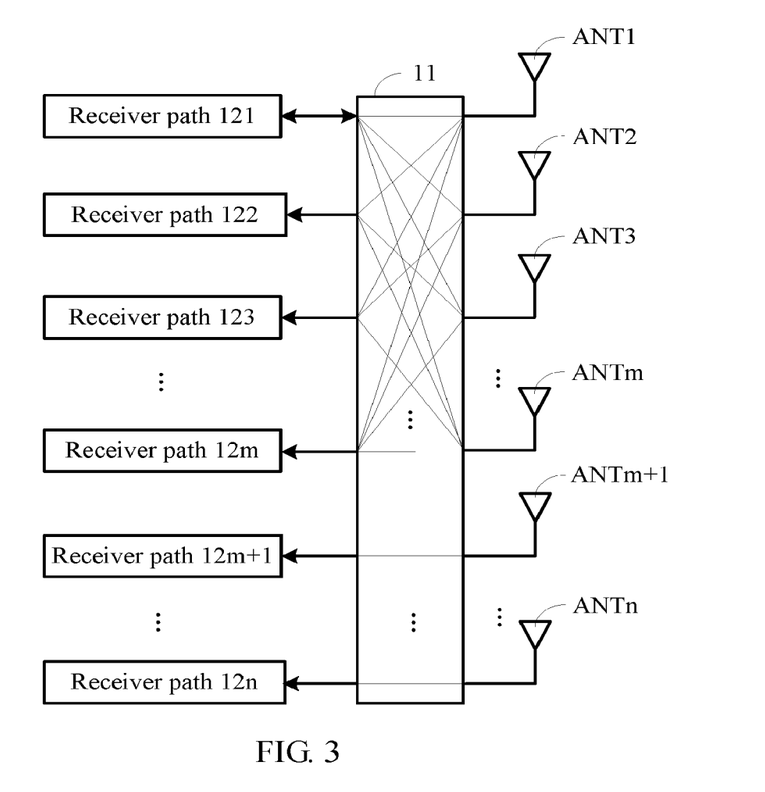
FIG. 3 is a schematic diagram of an antenna structure according to another exemplary aspect of the present disclosure.

As shown in FIG. 3, m antennas ANT1-ANTm (m is an integer less than n) among the antennas ANT1-ANTn are respectively coupled with any one of the receiver path 121-12$m$ ranked from 1-st to m-th among the receiver paths 121-12$n$ according to the control of the switch 11, while the connection relationship between the remaining n-m receiver paths 12$m$+1-12$n$ and the antennas ANTm+1-ANTn is kept unchanged. For example, the receiver path 12$m$ is coupled with the antennas ANTm, and the receiver path 12$m$+1 is fixedly coupled with the antenna ANTm+1, etc.

The connection relationship between the antennas and the receiver paths is changed by the above "locally switched" manner. In the "locally switched" manner, a part of the receiver paths with relatively low ranking does not to participate in switching, thereby reducing the complexity of switching (especially when the number of antennas is large), and improving the switching efficiency. Taking the above ranking based on sensitivity as an example, since the sensitivities of the receiver paths 12$m$+1-12$n$ ranked from (m+1)-th to n-th is lower than that of the receiver paths 121-12$m$ ranked from 1-st to m-th, even if the antennas ANTm+1-ANTn coupled with the receiver paths 12$m$+1-12$n$ are switched, the effect of improving the overall performance of the antenna structure is relatively small. Thus, the receiver paths 12$m$+1-12$n$ do not to participate in ranking. In this way, the complexity of switching the connection relationship may be reduced under the condition of ensuring less influence on the performance of the antenna structure, thereby effectively improving the switching efficiency.

The switch 11 may be configured to couple the plurality of antennas with the plurality of receiver paths according to a preset connection relationship in a default state. The preset connection relationship may be obtained according to a connection relationship between the antennas and the receiver paths in historical data. For example, a connection relationship corresponding to the antenna structure with a relatively high performance in most cases in the historical data may be selected as the preset connection relationship. The historical data may be obtained through multiple experiments. The preset connection relationship may also be flexibly configured according to actual applications, and the disclosure does not limit this.

The positions of the plurality of antennas in the antenna structure may be configured to be not exactly the same. For example, the positions of at least part of the plurality of antennas are different. By configuring the different antenna positions, the influence of the external environment on the received signals of the antennas may be reduced. In this way, the signal strength of each of the at least part of antennas is relatively high, thereby improving the overall performance of the antenna structure. This is because, when the antennas are all placed in a same position, if the position is occluded or blocked, the signal strength of all the antennas located at the position may be decreased, thereby resulting in a decrease in the performance and throughput of the antenna structure.

Figure 4:
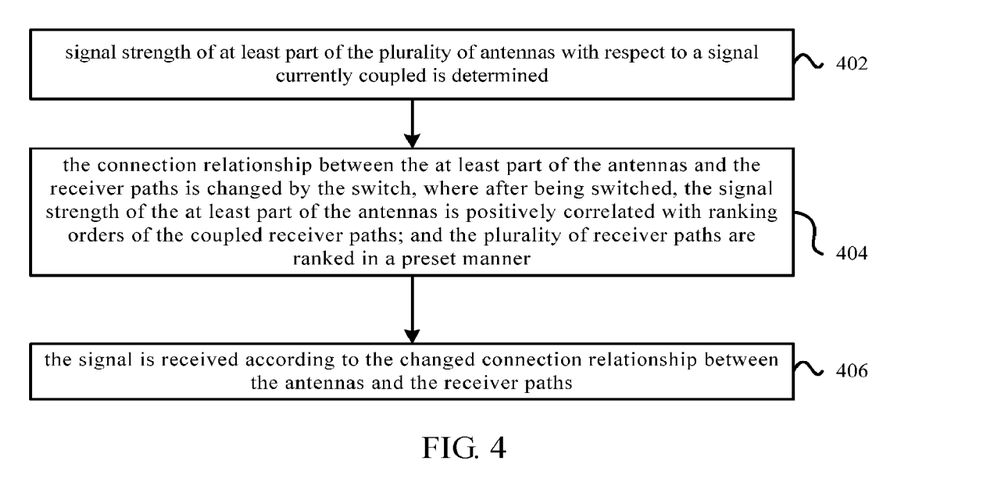
FIG. 4 is a flow diagram of a method of receiving a signal by an electronic device according to an exemplary aspect of the present disclosure.

Correspondingly, based on the above antenna structure, the present disclosure further provides a method of receiving signals by an electronic device including the antenna structure in any of the above examples. As shown in FIG. 4, the method may include the following steps 402-406.

At step 402, signal strength of at least part of the plurality of antennas with respect to a signal currently coupled is determined.

At step 404, the connection relationship between the at least part of the antennas and the receiver paths is changed by the switch, where after being switched, the signal strength of the at least part of the antennas is positively correlated with ranking orders of the coupled receiver paths; and the plurality of receiver paths are ranked in a preset manner to obtain a ranking order of each of the plurality of receiver paths.

In some examples, the preset manner includes: ranking the plurality of receiver paths according to signal sensitivity in a descending order.

In some examples, when the number of antennas is relatively small, the antennas and the receiver paths may be globally switched; and when the number of antennas is relatively large, the antennas and the receiver paths may be locally switched. The number of antennas may be measured by a preset threshold to further determine which switching method to use. For example, when the number of the plurality of antennas is less than or equal to the preset threshold, the connection relationship between all the antennas and the receiver paths is switched or changed through the switch; when the number of the plurality of antennas is more than the preset threshold, the connection relationship between a part of the plurality of antennas each of which ranking order is less than or equal to the preset threshold and the receiver paths is switched or changed through the switch.

At step 406, the signal is received according to the changed connection relationship between the antennas and the receiver paths.

In examples of the present disclosure, on the one hand, a signal is received based on the plurality of antennas and the plurality of the receiver paths, which can effectively improve sensitivity and throughput of the signal reception of the antenna structure. On the other hand, the connection relationship between the antennas and the receiver path may be dynamically switched or changed in real time according to the signal strength of the antennas with respect to the signal in the actual environment. In this way, it is ensured that the receiver path with higher ranking is always coupled with the antenna with higher signal strength, thereby maximizing the receiving performance of the antenna structure.

Following is a detailed description of the technical solution provided by examples of the present disclosure in combination with the method of receiving a signal by the electronic device described above.

Figure 5:
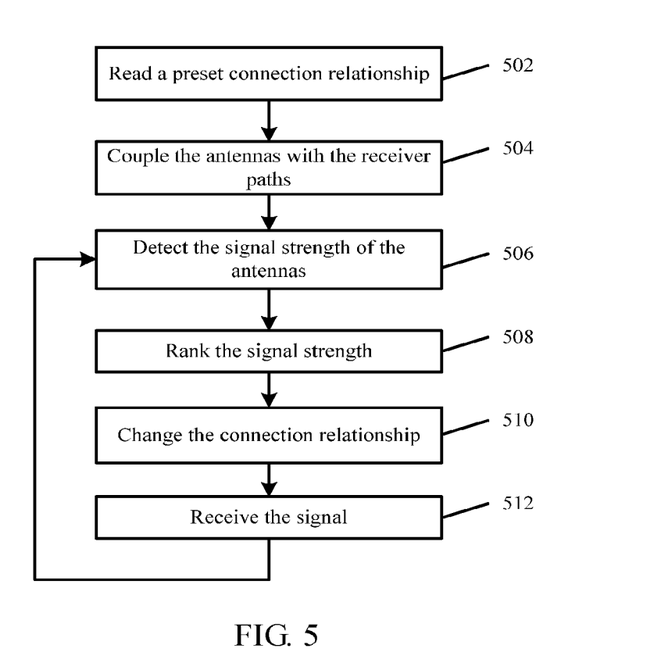
FIG. 5 is a flow diagram of a method of receiving a signal by an electronic device according to another exemplary aspect of the present disclosure.

FIG. 5 is a flow diagram of a method of receiving a signal by an electronic device according to an example. As shown in FIG. 5, the method is applied to the electronic device and includes the following steps 502-512.

At step 502, a preset connection relationship is read.

At step 504: the antennas are coupled with the receiver paths according to the preset connection relationship.

In some examples, the connection relationship between each antenna and each receiver path may be pre-stored in a memory of the electronic device as the preset connection relationship. For example, the connection relationship in which the performance of the antenna structure is relatively high in most cases of the history data may be selected as the preset connection relationship. Where, the historical data may be measured through many experiments. Of course, the preset connection relationship may also be flexibly configured according to actual conditions, and the disclosure does not limit this. In an example, the electronic device may be configured to read the preset connection relationship during initialization (e.g., when the electronic device is powered on), and control the switch to couple the antenna and the receiver path according to the preset connection relationship.

For example, the preset connection relationship may be as shown in Table 1:

TABLE 1

| Path (ranked by sensitivity in a descending order) | Antenna |
| --- | --- |
| Transmitter/Primary receiver path | ANT1 |
| Diversity receiver path 1 | ANT2 |
| Diversity receiver path 2 | ANT3 |
| Diversity receiver path 3 | ANT4 |

The transmitter path and the primary receiver path share the same hardware path, and the sensitivity of the transmitter path and the primary receiver path may be configured to be higher than that of the diversity receiver paths, so as to preferentially ensure the transmitting performance and the primary receiving performance of the antenna structure.

At step 506, signal strength of the respective antennas with respect to the signal currently coupled is detected.

At step 508, the detected signal strength is ranked.

At step 510, the connection relationship between the antennas and each receiver path is changed through a switch.

At step 512, the signal is received according to the changed connection relationship between each of the plurality of antennas and the receiver paths, and return to step 506.

In an example, when the electronic device is coupled with a signal within a certain frequency band, the signal strength of each antenna with respect to the signal may be different. For example, following the example in Table 1 above, it is assumed that the signal strength in a descending order is ANT4, ANT2, ANT1 and ANT5. The following takes the preset threshold being 4 antennas as an example to illustrate the cases of "globally switched" and "locally switched" respectively.

Figure 6:
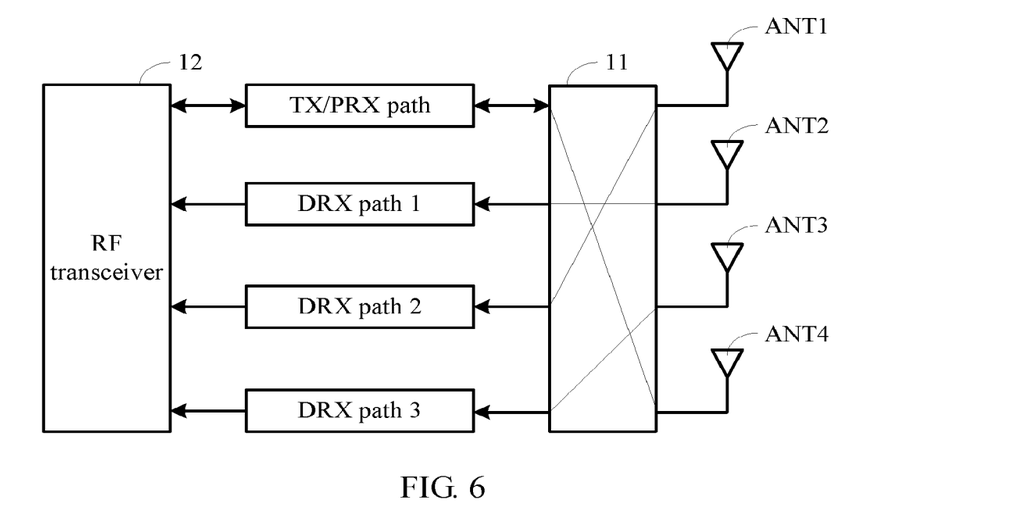
FIG. 6 is a schematic diagram of an antenna structure according to a still exemplary aspect of the present disclosure.
Figure 7:
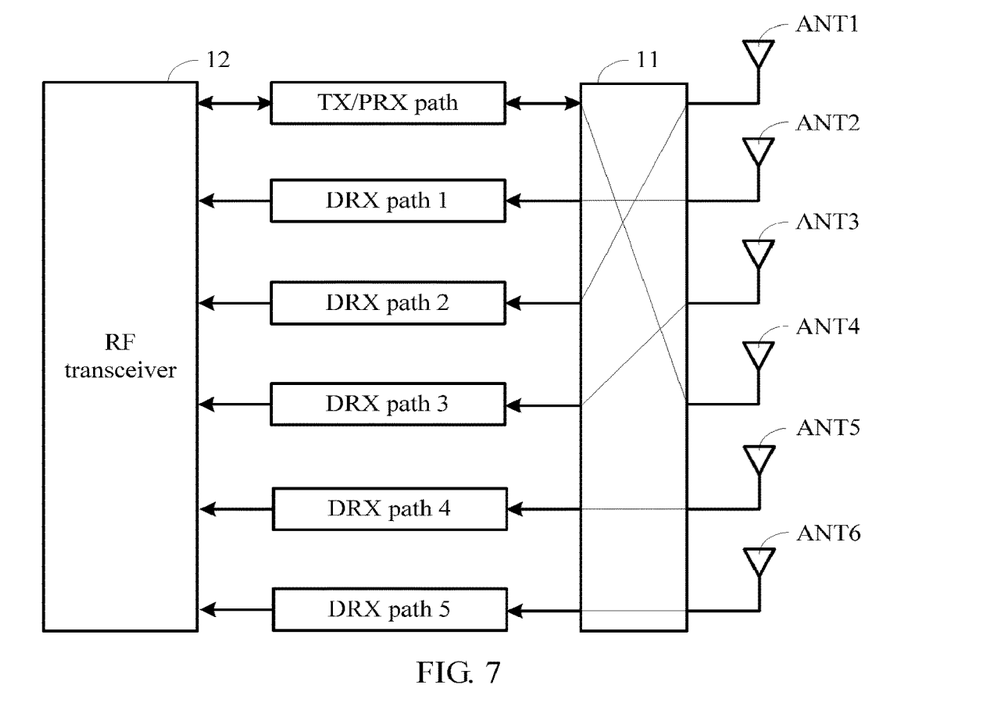
FIG. 7 is a schematic diagram of an antenna structure according to a yet exemplary aspect of the present disclosure.

FIGS. 6 and 7 respectively shows an antenna structure. As shown in FIG. 6, the antenna structure of the electronic device includes a switch 11, four antennas ANT1-ANT4, a transmitter path, a primary receiver path, and three diversity receiver paths 1-3. The switch 11 may be an NPNT (N Pole N Throw) switch. In this example, N=4, that is, the switch 11 is a 4 Pole 4 Throw switch. The transmitter path and the primary receiver path share the same hardware path and are coupled with a RF transceiver 12 in the electronic device, to realize primary transmission and primary reception. The diversity receiver paths 1-3 are coupled with the RF transceiver 12 to realize respective diversity reception. Then, according to the ranking order of each receiver path and the ranking order of the signal strength of each antenna, the connection relationship between the receiver paths and the antennas may be switched as shown in Table 2:

TABLE 2

| Path (ranked by sensitivity in a descending order) | Antenna |
| --- | --- |
| Transmitter/Primary receiver path | ANT4 |
| Diversity receiver path 1 | ANT2 |
| Diversity receiver path 2 | ANT1 |
| Diversity receiver path 3 | ANT3 |

As shown in FIG. 7, on the basis of Table 1, the antenna structure of the electronic device further includes diversity receiver paths 4-5 and antennas ANT5-ANT6. The diversity receiver path 4 and the antenna ANT5 are fixedly coupled; the diversity receiver path 5 and the antenna ANT6 are fixedly coupled, and the diversity receiver paths 4-5 are coupled with the RF transceiver 12 to realize respective diversity reception. In an example, according to the ranking order of the above paths and the ranking order of the signal strength of the antennas, the connection relationship between the receiver paths and the antennas may be changed as shown in Table 3, where paths coupled with the antenna ANT1-ANT4 are changed:

TABLE 3

| Path (ranked by sensitivity in a descending order) | Antenna |
| --- | --- |
| Transmitter/Primary receiver path | ANT4 |
| Diversity receiver path 1 | ANT2 |
| Diversity receiver path 2 | ANT1 |
| Diversity receiver path 3 | ANT3 |
| Diversity receiver path 4 | ANT5 |
| Diversity receiver path 5 | ANT6 |

The present disclosure further provides an electronic device, which may include the antenna structure in any of the above examples. In the following, take a mobile phone as an example to illustrate the distribution of antennas in an antenna structure.

Figure 8:
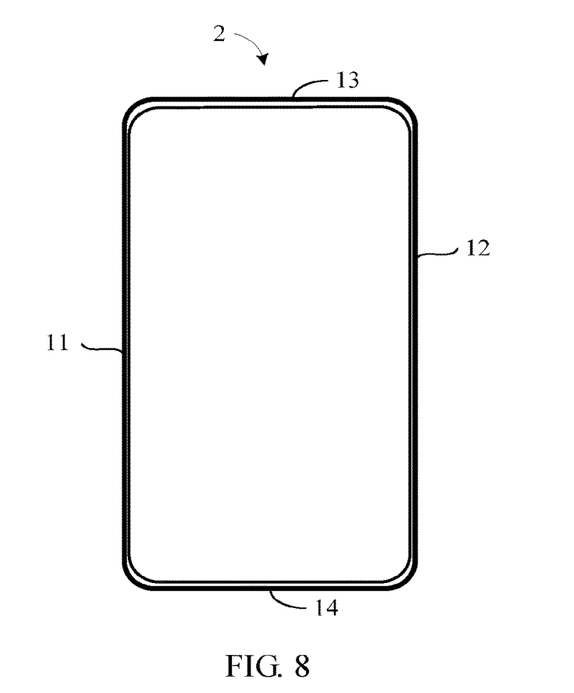
FIG. 8 is a schematic diagram of an antenna position according to an exemplary aspect of the present disclosure.

FIG. 8 is a schematic diagram of an antenna position according to an example. As shown in FIG. 8, the antenna structure (not shown) of the mobile phone 2 includes a plurality of antennas. The plurality of antennas are classified into a first classification and a second classification. The first classification may be configured on both sides of the mobile phone 2, such as the left side 11 and/or the right side 12 in FIG. 8. The second classification may be configured on the top 13 and/or bottom 14 of the mobile phone 2. In an example, a frame of the mobile phone 2 may be as an antenna. For example, the metal frame on the side of the mobile phone 2 such as the two sides 11, 12 may be used as the antenna, or the metal frame on the top 13 or the bottom 14 may be used as the antenna. The metal frame on the side of the mobile phone 2 may be integral with a back surface of the mobile phone 2. For example, the mobile phone adopts a metal body, and the back surface and the side surface are a piece of metal structure. In this example, the side metal frame may be a metal portion located on the side surface of the mobile phone 2, and does not include a metal portion on the back surface of the mobile phone 2. In another example, the antennas may be configured in an internal space of the mobile phone 2. For example, the antennas may be configured on an inside of the frame of the mobile phone 2, for example, an inner side of the frame on both sides 11, 12. Similarly, the antenna may also be configured on an inner side of the top 13 or the bottom 14 of the mobile phone 2.

Figure 9:
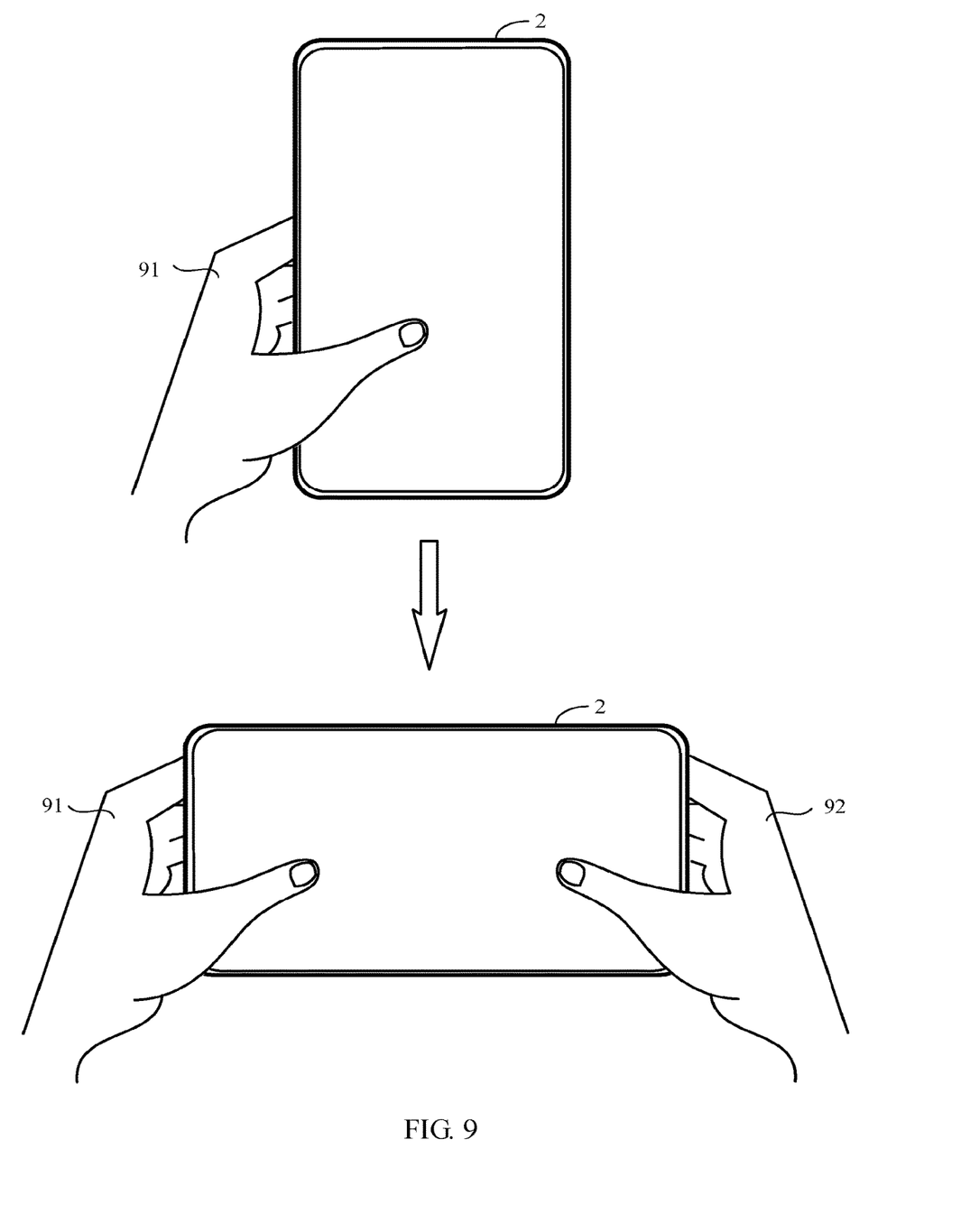
FIG. 9 is a schematic diagram showing a scenario in which a user changes a posture for holding a mobile phone according to an exemplary aspect of the present disclosure.

FIG. 9 is a schematic diagram showing a scenario in which a user changes a posture for holding a mobile phone according to an example. As shown in FIG. 9, the left side, the right side, the top, and the bottom of the mobile phone 2 are sequentially provided with antennas ANT1-ANT4. The preset connection relationship between each antenna and each receiver path is as shown in Table 4:

TABLE 4

| Path (ranked by sensitivity in a descending order) | Antenna |
|---|---|
| Transmitter/Primary receiver path | ANT4 (bottom) |
| Diversity receiver path 1 | ANT2 (right side) |
| Diversity receiver path 2 | ANT1 (left side) |
| Diversity receiver path 3 | ANT3 (top) |

When the user operates the mobile phone 2 with the left hand 91, the signal strength of the antenna ANT1 on the left side may be poor due to the occlusion of the left hand 91, so the connection relationship may be changed as shown in Table 5:

TABLE 5

| Path (ranked by sensitivity in a descending order) | Antenna |
|---|---|
| Transmitter/Primary receiver path | ANT4 (bottom) |
| Diversity receiver path 1 | ANT2 (right side) |
| Diversity receiver path 2 | ANT3 (top) |
| Diversity receiver path 3 | ANT1 (left side) |

When the user holds the mobile phone 2 horizontally with the left hand 91 and the right hand 92 (assuming that the signal strength of the antenna ANT2 is greater than the signal strength of the antenna ANT1 at this time), due to the occlusion of the left hand 91 and the right hand 92, the signal strength of the antenna ANT3 on the top and the antenna ANT4 on the bottom may be poor (assuming that the signal strength of the antenna ANT3 is greater than the signal strength of the antenna ANT4 at this time), so the connection relationship may be changed as shown in Table 6:

TABLE 6

| Path (ranked by sensitivity in a descending order) | Antenna |
|---|---|
| Transmitter/Primary receiver path | ANT2 (right side) |
| Diversity receiver path 1 | ANT1 (left side) |
| Diversity receiver path 2 | ANT3 (top) |
| Diversity receiver path 3 | ANT4 (bottom) |

Corresponding to the above example of the method of receiving a signal by the electronic device, the present disclosure also provides an example of the signal receiving apparatus in the electronic device.

Figure 10:
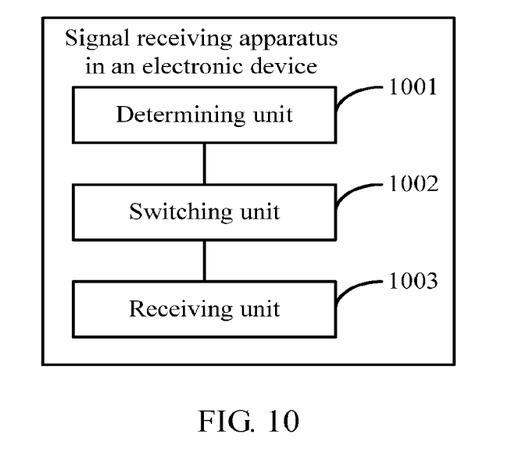
FIG. 10 is a block diagram of a signal receiving apparatus in an electronic device according to an exemplary aspect of the present disclosure.

FIG. 10 is a block diagram of a signal receiving apparatus in an electronic device. Where the signal receiving apparatus includes an antenna structure including a plurality of receiver paths, a plurality of antennas, and a switch located between the plurality of receiver paths and the plurality of antennas. As shown in FIG. 10, the signal receiving apparatus includes:

a determining unit 1001 configured to determine signal strength of at least part of the plurality of antennas with respect to a signal currently coupled with the at least part of the plurality of antennas;

a switching unit 1002 configured to change a connection relationship between the at least part of the plurality of antennas and the plurality of the receiver paths through the switch, where after being changed, the signal strength of the at least part of the plurality of antennas is positively correlated with ranking orders of the coupled receiver paths; the plurality of receiver paths are ranked in a preset manner; and a receiving unit 1003 configured to receive the signal according to a changed connection relationship between the plurality of antennas and the plurality of the receiver paths.

Optionally, the plurality of receiver paths may be ranked in a descending order according to the signal sensitivity.

Figure 11:
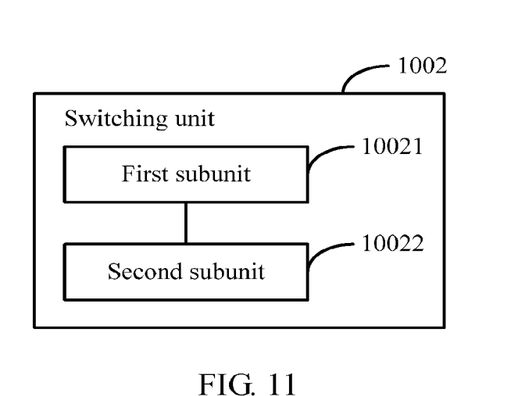
FIG. 11 is a block diagram of a signal receiving apparatus in an electronic device according to another exemplary aspect of the present disclosure.

FIG. 11 is a block diagram of a signal receiving apparatus in another electronic device according to an example. As shown in FIG. 11, the switching unit 1002 may further include:

a first switching subunit 10021 configured to switch or change the connection relationship between all the antennas and the receiver paths through the switch, when the number of the plurality of antennas is less than or equal to the preset threshold;

a second switching subunit 10022 configured to switch or change the connection relationship between a part of the plurality of antennas each of which ranking order is less than or equal to the preset threshold and the receiver paths through the switch, when the number of the plurality of antennas is more than the preset threshold.

Regarding the device in the above example, the specific way in which each module performs operations has been described in detail in the example related to the method, and will not be described in detail here.

Since the device examples substantially correspond to the method examples, a reference may be made to part of the descriptions of the method examples for the related part. The device examples described above are merely illustrative, where the components described as separate members may be or not be physically separated, and the members displayed as components may be or not be physical components, i.e., may be located in one place, or may be distributed to a plurality of network components. Part or all of the modules may be selected according to actual requirements to implement the objectives of the solutions in the examples. Those of ordinary skill in the art may understand and carry out them without creative work.

Correspondingly, the present disclosure further provides a method of receiving a signal by an electronic device, including: a processor; a memory for storing instructions executable by the processor. Where the processor is configured to realize a method of receiving a signal by an electronic device as described in any of the above examples. In an example, the method may include: determining signal strength of at least part of the plurality of antennas with respect to a signal currently coupled with the at least part of the plurality of antennas; changing a connection relationship between the at least part of the plurality of antennas and the plurality of the receiver paths through the switch, where after being changed, the signal strength of the at least part of the plurality of antennas is positively correlated with ranking orders of the coupled receiver paths; the plurality of receiver paths are ranked in a preset manner; and receiving the signal according to a changed connection relationship between the plurality of antennas and the plurality of the receiver paths.

Correspondingly, the present disclosure also provides a terminal including a memory and one or more programs. The one or more programs are stored in a memory and configured to be executed by one or more processors, and the one or more programs include instructions for implementing the method of receiving a signal by an electronic device as described in any of the above examples. In an example, the method may include: determining signal strength of at least part of the plurality of antennas with respect to a signal currently coupled with the at least part of the plurality of antennas; changing a connection relationship between the at least part of the plurality of antennas and the plurality of the receiver paths through the switch, where after being changed, the signal strength of the at least part of the plurality of antennas is positively correlated with ranking orders of the coupled receiver paths; the plurality of receiver paths are ranked in a preset manner; and receiving the signal according to a changed connection relationship between the plurality of antennas and the plurality of the receiver paths.

Figure 12:
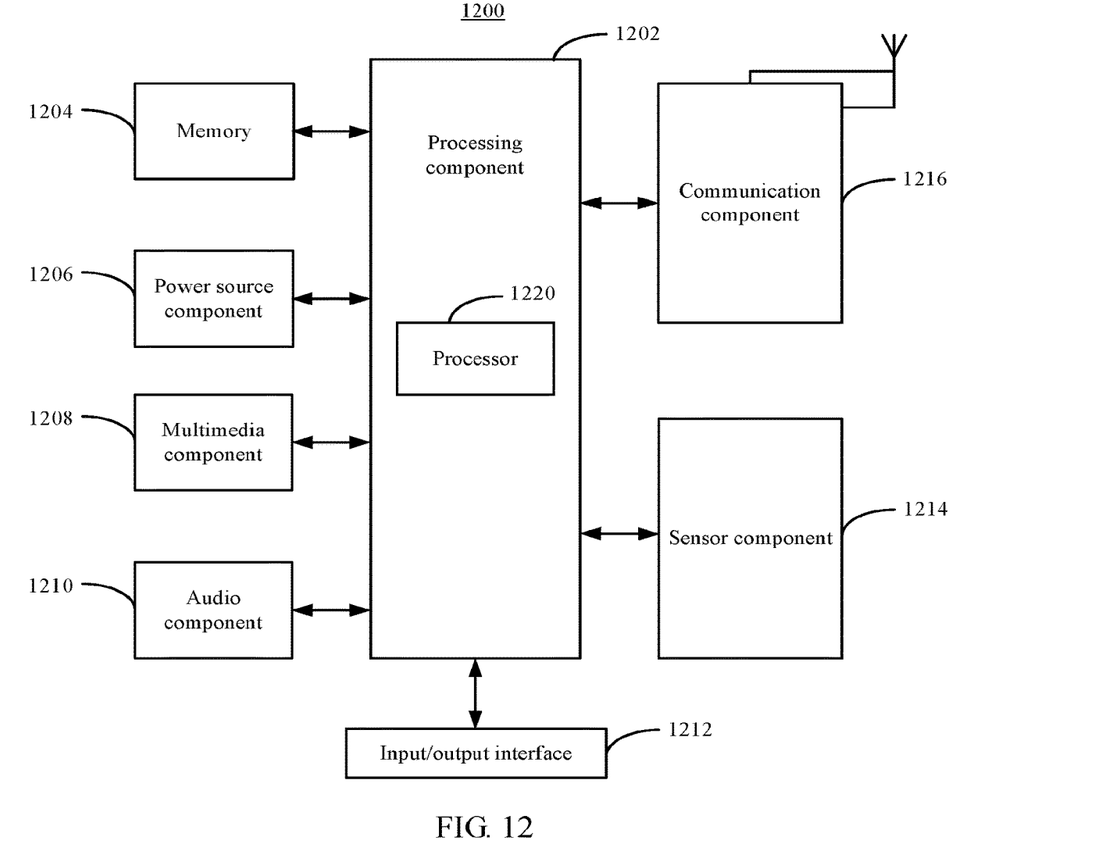
FIG. 12 is a structural diagram of an electronic device according to an exemplary aspect of the present disclosure.

FIG. 12 is structural diagram of an electronic device according to an example. For example, the device 1200 may be a mobile phone, a computer, a digital broadcast terminal, a message transceiver, a game console, a tablet device, a medical device, a fitness device, a personal digital assistant, and so on.

As shown in FIG. 12, the device 1200 may include one or more of the following components: a processing component 1202, a memory 1204, a power supply component 1206, a multimedia component 1208, an audio component 1210, an input/output (I/O) interface 1212, a sensor component 1214 and a communication component 1216.

The processing component 1202 generally controls the overall operation of the device 1200, such as operations associated with display, phone call, data communication, camera operation, and recording operation. The processing component 1202 may include one or more processors 1220 to execute instructions. In addition, the processing component 1202 may include one or more modules to facilitate the interaction between the processing component 1202 and other components. For example, the processing component 1202 may include a multimedia module to facilitate the interaction between the multimedia component 1208 and the processing component 1202.

The memory 1204 is configured to store different types of data to support operation at the device 1200. Examples of such data include instructions for any application or method that operates on the device 1200, contact data, phonebook data, messages, pictures, videos, and so on. The memory 1204 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 1206 may provide power for different components of the device 1200. The power supply component 1206 may include a power supply management system, one or more power sources, and other components associated with generating, managing and distributing power for the device 1200.

The multimedia component 1208 includes a screen providing an output interface between the device 1200 and a user. In some examples, the screen may include a Liquid Crystal Display (LCD) and/or a Touch Panel (TP). If the screen includes a touch panel, the screen may be implemented as a touch screen to receive an input signal from a user. The touch panel includes one or more touch sensors to sense touch, slip, and gestures on the touch panel. The touch sensor may not only sense the boundary of a touch or slip operation but also detect duration and pressure relating to the touch or slip operation. In some examples, the multimedia component 1208 may include a front-facing camera and/or a rear camera. When the device 1200 is in an operating mode, such as in a shooting mode or a video mode, the front-facing camera and/or the rear camera may receive external multimedia data. Each of the front-facing camera and the rear camera may be a fixed optical lens system or may be capable of focal length and optical zoom.

The audio component 1210 is configured to output and/or input an audio signal. For example, the audio component 1210 includes a microphone (MIC). When the device 1200 is in an operating mode, for example, in a call mode, a recording mode or a speech recognition mode, the microphone is configured to receive an external audio signal. The received audio signal may be further stored in the memory 1204 or sent via the communication component 1216. In some examples, the audio component 1210 also includes a speaker for outputting an audio signal.

The I/O interface 1212 provides an interface between the processing component 1202 and a peripheral interface module. The peripheral interface module may be a keyboard, click wheel, a button and the like. Such buttons may include but not limited to: a home button, a volume button, a start button, and a lock button.

The sensor component 1214 includes one or more sensors for evaluating states of the device 1200 in different aspects. For example, the sensor component 1214 may detect the on/off state of the device 1200, and relative locations of components, for example, the component is a display and a keypad of the device 1200. The sensor component 1214 may also detect a position change of the device 1200 or one component of the device 1200, the presence or absence of contact of a user with the device 1200, an orientation or acceleration/deceleration of the device 1200 and a temperature change of the apparatus 700. The sensor component 1214 may include a proximity sensor configured to detect presence of a nearby object without any physical contact. The sensor component 1214 may also include an optical sensor, such as a CMOS or CCD image sensor to be used in imaging application. In some examples, the sensor component 1214 may also include an acceleration sensor, a gyroscope sensor, a magnetic sensor, a pressure sensor, or a temperature sensor.

The communication component 1216 is configured to facilitate wired or wireless communication between the device 1200 and other devices. The device 1200 may access a wireless network based on a communication standard, such as WIFI, 2G or 3G, or a combination thereof. In some examples, the communication component 1216 may receive a broadcast signal or broadcast-related information from an external broadcast management system via a broadcast path. In some examples, the communication component 1216 may also include a Near Field Communication (NFC) module to facilitate short-range communications. For example, the NFC module may be implemented based on RF Identification (RFID) technology, Infrared Data Association (IrDA) technology, Ultra Wide Band (UWB) technology, Bluetooth (BT) technology and other technology.

In some examples, the device 1200 may be implemented by one or more of an Application-Specific Integrated Circuit (ASIC), a Digital Signal Processor (DSP), a Digital Signal Processing Device (DSPD), a Programmable Logical Device (PLD), a Field Programmable Gate Array (FPGA), a controller, a microcontroller, a microprocessor or other electronic elements for performing the above methods.

In some examples, there is provided a non-transitory computer-readable storage medium storing instructions, for example, a storage medium 1204 storing instructions. The instructions may be executed by the processor 1220 of the device 1200. For example, the non-transitory computer readable storage medium may be a Read-Only Memory (ROM), a Random Access Memory (RANI), CD-ROM, a magnetic tape, a floppy disk, and an optical data storage device and so on.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An antenna structure comprising:
   a plurality of receiver paths that are ranked based on a preset manner to obtain a ranking order of each of the plurality of receiver paths;
   a plurality of antennas; and
   a switch disposed between the plurality of antennas and the plurality of receiver paths, wherein the switch is configured to change a connection relationship between the plurality of antennas and the plurality of receiver paths based on a signal strength of the plurality of antennas and the ranking order of the plurality of the receiver paths;
   wherein the plurality of antennas are coupled with the plurality of receiver paths by the switch based on a preset connection relationship in a default state, and
   wherein the preset connection relationship is obtained according to a connection relationship between the plurality of antennas and the plurality of receiver paths in historical data.

2. The antenna structure according to claim 1, wherein the switch is further configured to:
   according to a signal strength of at least one of the plurality of antennas, determine receiver paths in the plurality of receiver paths to couple with the at least one of the plurality of antennas, such that the signal strength of the at least one of the plurality of antennas is positively correlated with ranking orders of the coupled receiver paths.

3. The antenna structure according to claim 1, wherein the plurality of receiver paths are ranked based on signal sensitivity in a descending order.

4. The antenna structure according to claim 1, wherein the plurality of receiver paths comprise:
   at least one first receiver path, wherein a connection relationship between the at least one first receiver path and the plurality of antennas is unchanged; and
   at least one second receiver path other than the at least one first receiver path in the plurality of receiver paths, wherein the ranking order of each of the at least one first receiver path is lower than the ranking order of each of the at least one second receiver path.

5. The antenna structure according to claim 1, wherein the plurality of receiver paths comprise:
   a particular receiver path as a primary transmitter path and a primary receiver path; and
   remaining receiver paths other than the particular receiver path in the plurality of receiver paths as diversity receiver paths.

6. The antenna structure of claim 5, wherein a ranking order of the particular receiver path is highest.

7. The antenna structure according to claim 1, wherein positions of the at least one of the plurality of antennas are different.

8. A method of receiving a signal by an electronic device including an antenna structure that includes a plurality of receiver paths, a plurality of antennas, and a switch disposed between the plurality of antennas and the plurality of receiver paths, the method comprising:
   determining a signal strength of at least one of the plurality of antennas with respect to a signal currently associated with the at least one of the plurality of antennas;
   changing a connection relationship between the at least one of the plurality of antennas and the plurality of the receiver paths through the switch, wherein after being changed, the signal strength of the at least one of the plurality of antennas is positively correlated with ranking orders of the coupled receiver paths, wherein the plurality of receiver paths are ranked based on a preset manner to obtain a ranking order of each of the plurality of receiver paths; and
   receiving the signal based on a changed connection relationship between the plurality of antennas and the plurality of the receiver paths.

9. The method according to claim 8, wherein the preset manner comprises:
   ranking the plurality of receiver paths according to signal sensitivity in a descending order.

10. The method according to claim 8, wherein switching the connection relationship between the at least one of the plurality of antennas and the plurality of receiver paths through the switch comprises:
    when a number of the plurality of antennas does not exceed a preset threshold, changing the connection relationship between the plurality of antennas and the plurality of receiver paths through the switch; and
    when the number of the plurality of antennas exceeds the preset threshold, changing a connection relationship between at least one of the plurality of antennas having a ranking order less than or equal to the preset threshold and the receiver paths through the switch.

11. An electronic device comprising:
an antenna structure comprising:
   a plurality of receiver paths that are ranked based on a preset manner to obtain a ranking order of each of the plurality of receiver paths;
   a plurality of antennas; and
   a switch disposed between the plurality of antennas and the plurality of receiver paths, wherein the switch is configured to change a connection relationship between the plurality of antennas and the plurality of receiver paths based on a signal strength of the plurality of antennas and the ranking order of the plurality of the receiver paths;
wherein the plurality of antennas are coupled with the plurality of receiver paths by the switch based on a preset connection relationship in a default state, and
wherein the preset connection relationship is obtained according to a connection relationship between the plurality of antennas and the plurality of receiver paths in historical data.

12. The electronic device according to claim 11, wherein the switch is further configured to:
   according to a signal strength of at least one of the plurality of antennas, determine receiver paths in the plurality of receiver paths to couple with the at least one of the plurality of antennas, such that the signal strength of the at least one of the plurality of antennas is positively correlated with ranking orders of the coupled receiver paths.

13. The antenna structure according to claim 11, wherein the plurality of receiver paths are ranked based on signal sensitivity in a descending order.

14. The electronic device according to claim 11, wherein the plurality of antennas are classified into a first antenna set and a second antenna set,
   wherein the first antenna set is located on two sides of the electronic device, and
   wherein the second antenna set is located on a top or a bottom of the electronic device.

15. The electronic device according to claim 11, wherein the plurality of receiver paths comprise:
   at least one first receiver path, wherein a connection relationship between the at least one first receiver path and the plurality of antennas is unchanged; and
   at least one second receiver path other than the at least one first receiver path in the plurality of receiver paths, wherein the ranking order of each of the at least one first receiver path is lower than the ranking order of each of the at least one second receiver path.

16. The electronic device according to claim 11, wherein the plurality of receiver paths comprise:
   a particular receiver path as a primary transmitter path and a primary receiver path, and remaining receiver paths other than the particular receiver path in the plurality of receiver paths as diversity receiver paths.

17. The electronic device of claim 16, wherein a ranking order of the particular receiver path is highest.

18. The electronic device according to claim 11, wherein positions of the at least one of the plurality of antennas are different.

* * * * *